United States Patent
Creamer et al.

(10) Patent No.: US 8,219,671 B2
(45) Date of Patent: *Jul. 10, 2012

(54) TESTING APPLICATIONS WITHIN A GRID ENVIRONMENT USING GHOST AGENTS

(75) Inventors: Thomas E. Creamer, Boca Raton, FL (US); Bill H. Hilf, La Habra, CA (US); Neil Katz, Parkland, FL (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 523 days.

This patent is subject to a terminal disclaimer.

(21) Appl. No.: 12/347,079

(22) Filed: Dec. 31, 2008

(65) Prior Publication Data

US 2009/0112565 A1 Apr. 30, 2009

Related U.S. Application Data

(63) Continuation of application No. 10/665,585, filed on Sep. 19, 2003, now Pat. No. 7,493,386.

(51) Int. Cl.
*G06F 15/173* (2006.01)
(52) U.S. Cl. ........ 709/224; 709/202; 709/238; 717/124; 717/131
(58) Field of Classification Search .................. 709/202, 709/224, 238; 714/38; 717/124, 131
See application file for complete search history.

(56) References Cited

U.S. PATENT DOCUMENTS

| | | | |
|---|---|---|---|
| 5,592,609 A | 1/1997 | Suzuki et al. | |
| 5,812,780 A | 9/1998 | Chen et al. | |
| 5,935,006 A | 8/1999 | Nakajima | |
| 6,024,643 A | 2/2000 | Begis | |
| 6,122,664 A | 9/2000 | Boukobza et al. | |
| 6,269,330 B1 | 7/2001 | Cidon et al. | |
| 6,282,697 B1 | 8/2001 | Fables et al. | |
| 6,419,577 B1 | 7/2002 | Okada et al. | |
| 6,564,342 B2 | 5/2003 | Landan | |
| 6,681,243 B1 | 1/2004 | Putzolu et al. | |
| 7,337,363 B2 | 2/2008 | Creamer et al. | |
| 2002/0002074 A1 | 1/2002 | White et al. | |
| 2002/0112048 A1 | 8/2002 | Gruyer et al. | |
| 2004/0103195 A1 | 5/2004 | Chalasani et al. | |
| 2004/0103339 A1 | 5/2004 | Chalasani et al. | |
| 2004/0139202 A1 | 7/2004 | Talwar et al. | |
| 2004/0210627 A1* | 10/2004 | Kroening | 709/201 |
| 2004/0225711 A1 | 11/2004 | Burnett et al. | |
| 2005/0066025 A1 | 3/2005 | Creamer et al. | |
| 2005/0076191 A1 | 4/2005 | Creamer et al. | |

* cited by examiner

*Primary Examiner* — Thomas Dailey
(74) *Attorney, Agent, or Firm* — Novak Druce + Quigg LLP

(57) ABSTRACT

A testing method including the step of identifying multiple hosts located within multiple grids of a grid environment, wherein each host is a software object. A ghost agent can be associated with each identified host. Actions of the host can be replicated within each ghost agent. Data relating to the replicated actions can be recorded. Test input can be generated from the recorded data. Tests can be conducted within the grid environment using the test input.

16 Claims, 5 Drawing Sheets

TESTING APPLICATIONS WITHIN A GRID ENVIRONMENT USING GHOST AGENTS

CROSS REFERENCE TO RELATED APPLICATIONS

This application is a continuation of, and accordingly claims the benefit of, U.S. patent application Ser. No. 10/665,585, filed with the U.S. Patent and Trademark Office on Sep. 19, 2003, now U.S. Pat. No. 7,493,386, the disclosure of which is hereby incorporated by reference.

BACKGROUND

1. Field of the Invention

The present invention relates to the field of computer software and, more particularly, to testing applications within a grid environment.

2. Description of the Related Art

A grid computing environment is a distributed computing environment where computing, application, storage, and/or network resources can be shared across geographically disperse organizations. An ideal grid computing environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid computing environment, such as Avaki's data grid from Avaki of Burlington, Me. and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

A grid computing environment can include multiple applications. Each application can include a set of computing resources that performs a series of related tasks. Examples of applications include, but are not limited to, word processors, database programs, Web browsers, development tools, drawing applications, image editing programs, and communication programs. The various computing resources for one application can be distributed across several different grids within a grid computing environment, wherein each grid can contains a myriad of diverse hardware components, such as communication lines, networking routers, servers, workstations, peripherals, intranets, and the like.

One problem with existing grid computing environments relates to testing application changes and/or new application implementations before deployment within an operational grid environment. Testing can be especially important within a grid environment because problems with one grid-enabled application can have cascading effects upon other applications. That is, since many different grid-enabled applications can share pooled resources, one malfunctioning application feature that overly consumes needed resources can affect multiple applications that share the commonly utilized resources. The interdependencies that exist among applications in a grid environment, however, make realistic tests of individual applications extremely difficult.

Conventional testing solutions involve extrapolation and have proven inadequate in modeling the complexities of operational grid behavior. Extrapolation testing methods attempt to simulate operational conditions using small, finite, measurable increments of system resources. The measurable increments are applied to an extrapolation algorithm in order to determine projected computing resource consumption. Extrapolation algorithms can then compare these projected consumptions with estimated computing resource availability. While extrapolation testing methods are useful for characterizing simplistic grid environments, extrapolation methods are inadequate for complex ones. For example, extrapolation testing methods cannot accurately determine behavior of multiple applications interoperating within several grids, each of which can experience usage peaks and troughs.

SUMMARY OF THE INVENTION

The invention disclosed herein provides a method, a system, and an apparatus for testing applications within a grid environment using ghost agents. More specifically, the present invention can utilize ghost agents to record actions performed within across multiple grids of a grid computing environment. These recorded actions can be used by a testing tool to realistically model the operational behavior of a grid environment. A ghost agent can be a software object associated with a host software object that records actions taken by the host. A host software object can include grid users, applications, application features, grid resources, and/or grid processes. Since ghost objects can move within a grid environment accordingly to the movement of their associated hosts, applications and processes that span across multiple grids can be tested by the invention. As used herein, movement in a grid environment refers to the movement from one grid component to another component within a grid and/or movement from one grid to a different grid of the grid environment.

One aspect of the present invention can include a testing method including the step of identifying multiple hosts located within multiple grids of a grid environment, wherein each host is a software object. A ghost agent can be associated with each identified host. Selective ones of the hosts can be moved from location to location within the grid environment. The ghost agents can be responsively moved in accordance with movements of the hosts. Actions of the host can be replicated within each ghost agent. The replicated actions can be passive actions that are not operationally executed in the grid environment. Data relating to the replicated actions can be recorded. Test input can be generated from the recorded data. Tests can be conducted within the grid environment using the test input. Operational metrics can also be determined for at least one component to be tested. The test input can be modified based on the operational metrics.

In one embodiment, the hosts can be disposed within a production segment of the grid environment. The tests can be performed within a test segment of the grid environment. The test input can be inputted into at least one ghost agent. Actions can be executed within the test segment based upon the ghost agent that received the test input. Further, ghost agents can be deployed within the test segment of the grid environment. Data relating to the tests performed in the test segment can be recorded using the deployed ghost agents.

In another embodiment, the hosts can be associated with a specific application. The testing can be conducted for the application. System requirements can be determined for the application based at least in part upon output from the testing. Usage data can be gathered for at least one different application using ghost agents. Further, a specific application can be tested while simultaneously simulating load conditions resulting from the at least one different application.

Another aspect of the present invention can include a system for testing applications within a grid environment. The grid environment can include a production segment and a test segment. Within the system, a host can execute actions within the production segment. The host can also move from one grid location to another grid location. A ghost agent can record data related to the actions executed by the host. The recorded data can be used to simulate user interactions within the test segment. The ghost agent can be further configured to responsively move in accordance with movement of the host. Additionally, the system can include a different host configured to execute actions within the test segment and a different ghost agent configured to record data related to actions executed in the test segment. Additionally, another ghost agent can be included in the system that is configured to trigger the test segment host to execute actions. This triggering can be based upon data recorded by the ghost agent in the production segment.

Yet another aspect of the present invention can include a ghost agent including a ghost log, a ghost identifier, and a ghost controller. The ghost agent can move from location to location within the grid environment. Moreover, the ghost agent can be used to test grid-based applications. The ghost log can record data related to actions executed by a host, wherein the host is a software object. The ghost identifier can identify the ghost agent to components within a grid environment. The ghost controller can manage interactions between the ghost agent and the grid environment. The ghost agent can provide a means for generating test input. The ghost agent can also provide a means for simulating user actions during tests. Additionally, the ghost agent can provide a means for generating test output.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method, a system, and an apparatus for testing applications within a grid environment using ghost agents. The invention can utilize several ghost agents. For example, ghost agents can be deployed within a production segment of a grid environment to record user interactions and their affects upon the grid. The recorded actions can be used to emulate similar actions in a test segment of the grid environment when testing. Additional ghost agents can be deployed within the test segment and used to record test output.

As used herein, a ghost agent can be a self-managing, self-identifying software object capable of performing pre-defined tasks in a self-sufficient manner. Ghost agents can attach or bind themselves to a host in order to direct the activities occurring within the host to the ghost agent, thereby replicating the actions of the host. Any suitable technique can be used to attach the ghost agent to the host including, but not limited to, debugging attachment techniques, system calibration techniques, hardware performance testing techniques, and similar binding methodologies. Once replicated within the ghost agent, actions can be analyzed, decomposed, modified, and recorded without affecting the operationally executed actions of the host.

A ghost agent that does not have an operational effect upon the grid environment other than passively recording the actions of a host is referred to as a passive or "read-only" ghost agent. Another type of ghost agent, an active ghost agent, can perform actions that have an operational effect. For example, an active ghost agent can selectively prevent a host from performing one or more actions, can delay the actions of a host, and can modify one or more host actions. Additionally, a ghost agent can initialize new actions. Active ghost agents can perform actions responsive to predetermined conditions or received messages.

Figure 1:
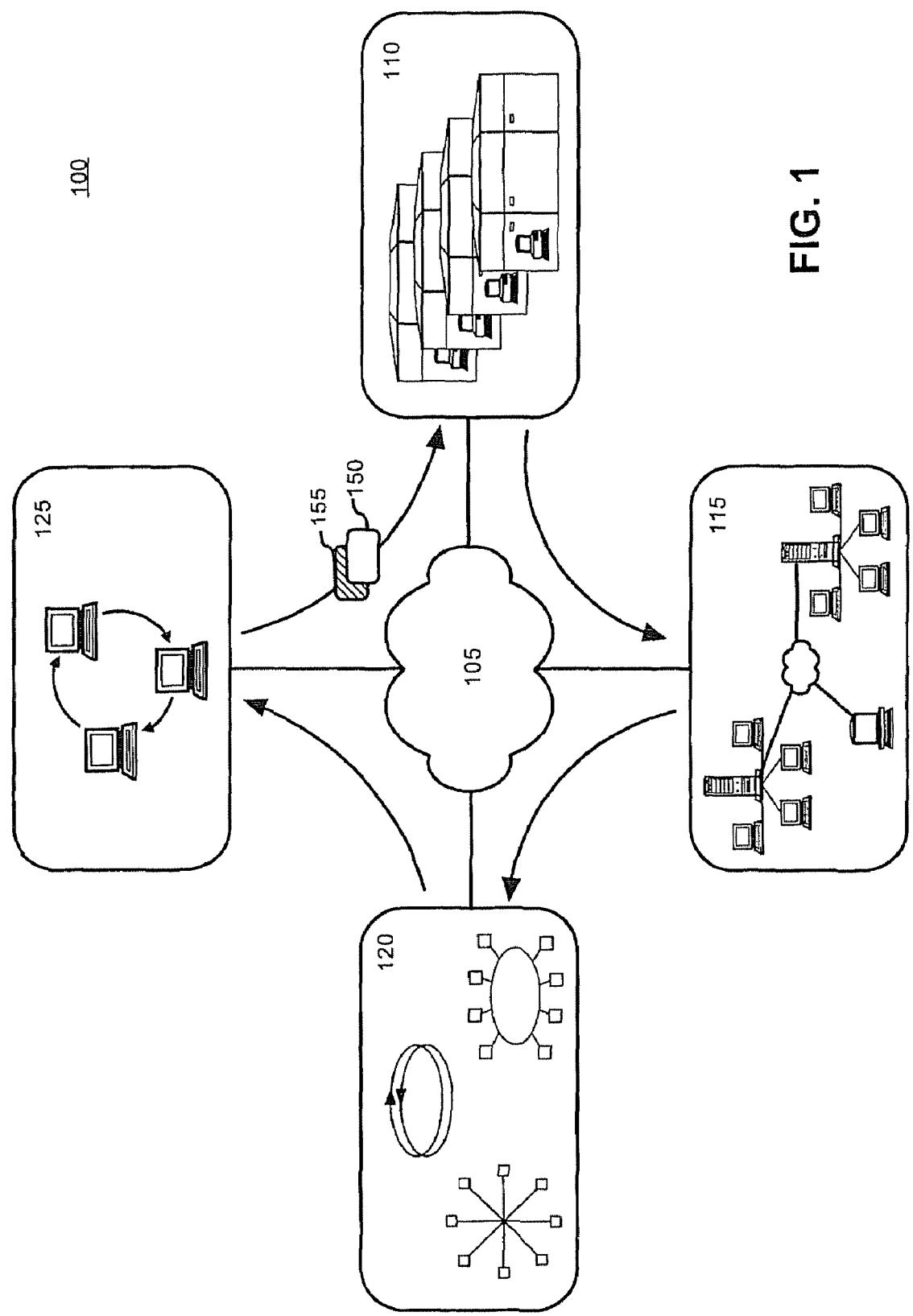
FIG. 1 is a schematic diagram illustrating an exemplary grid environment enabled for ghost agents and host processes in accordance with the inventive arrangements disclosed herein.

FIG. 1 is a schematic diagram illustrating an exemplary grid environment 100 enabled for ghost agents and hosts. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

As used herein, computing resources can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The grid environment 100 infrastructure can include components that utilize any hardware platform, operating system, storage scheme, and software resource. In order to be integrated within the grid environment 100, each computing component can be communicatively linked to the grid environment 100 through the network 105. Each computing component can also adhere to the standards and protocols defined within the architecture of the grid environment 100. The grid environment 100 can include one or more grids, such as grids 110, 115, 120, and 125, communicatively linked to one another through a network 105. Each grid can represent a grouping of physically differentiable hardware resources.

The grid 110 can include a multitude of mainframe or supercomputers. The grid 115 can include several local area networks, workgroups, and computing arrays. The grid 120 can include computing resources arranged according to any topography including, but not limited to, star topographies, Fiber Distributed Data Interface (FDDI) rings, token rings, and the like. The grid 125 can include one or more peer-to-peer networks. One of ordinary skill in the art can appreciate that the invention is not to be limited in this regard, that any hardware resources, topography, and software can be included in the grid environment 100, and that such arrangements are contemplated herein.

Host 150 can be a software object capable of moving within the grid environment 100. For example, the host 150 can move from grid 110 to grid 115 or from grid 120 to grid 125 to grid 115. The host 150 can also move from one location within a grid to another location. For example, the host 150 can move from one workgroup in grid 115 to a different workgroup in grid 115. Whenever the host 150 moves, the associated ghost agent 155 can move accordingly. Accordingly, a ghost agent 155 can monitor the actions of an associated host in a location independent fashion.

One illustrative example of ghost agents 155 operating within a grid environment 100 can relate to a Massive Multi-Player Gaming (MMPG) system. Each player of the MMPG system can be represented by a host 150 that responds to user instructions and interacts with the gaming environment. While playing the MMPG, players can move from one game play area to another, thereby moving the host 150 within the grid environment 100. Ghost agents 155 can be attached to selected players. For example, a MMPG developer implementing a new guild or organization that players can join can attach ghost agents 155 to a portion of players belonging to the guild so that guild related behavior can be examined. That is, the ghost agent 155 can record the activities and actions of real players executed within a production environment. These actions can be used to construct realistic test input. The test input can be used to simulate user interactions for testing purposes.

Figure 2:
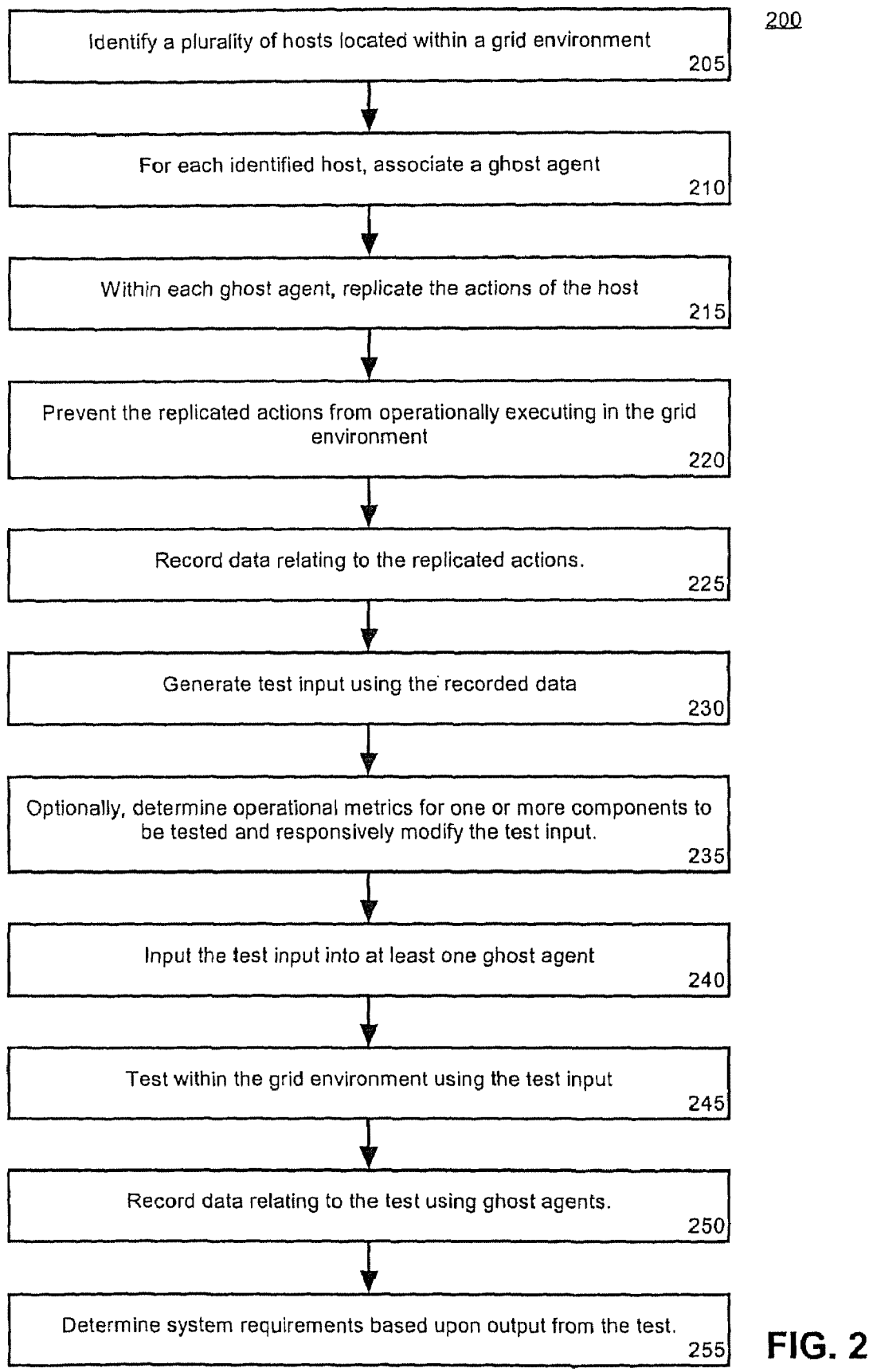
FIG. 2 is a flow chart illustrating a method for testing within a grid environment using ghost agents in accordance with the inventive arrangements disclosed herein.

FIG. 2 is a flow chart illustrating a method 200 for testing within a grid environment using ghost agents in accordance with the inventive arrangements disclosed herein. The method 200 can be performed in the context of a computing grid environment where a common pool of computing resources can be utilized by consumers. Additionally, the testing performed within method 200 can span multiple grids and components of the grid environment. Since individual components being tested do not necessarily reside within a fixed hardware location, traditional testing methodologies cannot be easily implemented. Further complicating the testing environment and emphasizing the need for method 200, many different applications and/or users can consume a tested resource in the grid environment making performance and load determinations for a discrete application test difficult.

The method 200 can begin in step 205 where a number of hosts can be identified, wherein each host can be a software object. The identified hosts can be located across many different grids in a grid environment and will generally be related. For example, the hosts can represent a statistically relevant number of users within a particular organization, where the organization can be the entity being tested by method 200. In another example, the hosts can represent applications that utilize a particular resource, where the resource can be the entity being tested. In yet another example, the hosts can be different features of an application, where the application can be the entity being tested. Selective hosts can move from location to location within a grid and from one grid within the grid environment to another grid.

In step 210, a ghost agent can be associated with each identified hosts. Once associated with a host, each ghost agent can move within the grid environment following the movement of its host. In step 215, each ghost agent can replicate the actions of the host. In step 220, the replicated actions can be prevented from operationally executing within the grid environment, meaning that the replicated actions can be passive actions. Not all ghost agents are strictly passive in nature and can instead be active ghost agents, wherein the replicated actions for active ghost agents result in operational actions being executed within the grid environment. However, the initial stages of method 200 exist to record interactions and are therefore generally passive in nature.

In step 225, data relating to the replicated actions can be recorded. In step 230, test input can be generated using the recorded data. Optionally, in step 235, operational metrics can be determined for one or more tested components. Operational metrics refer to performance and/or load metrics. For example, a particular performance metric can specify that a particular transaction must occur within one tenth of a second. A load metric can specify the usage level of a hardware component. The test input can be modified based upon the operational metrics. For example, to simulate an increased load, the number of times that a particular test action specified within the test input is executed can be increased.

In step 240, the test input can be inputted into at least one ghost agent. This ghost agent can be an active agent, which can be deployed within a test segment of the grid environment resulting in the test input actions being executed. In step 245, tests can be performed that use the test input to realistically simulate system behavior. In step 250, ghost agents can generate and record test output data. In step 255, system requirements can be determined based upon the recorded test output data.

Figure 3:
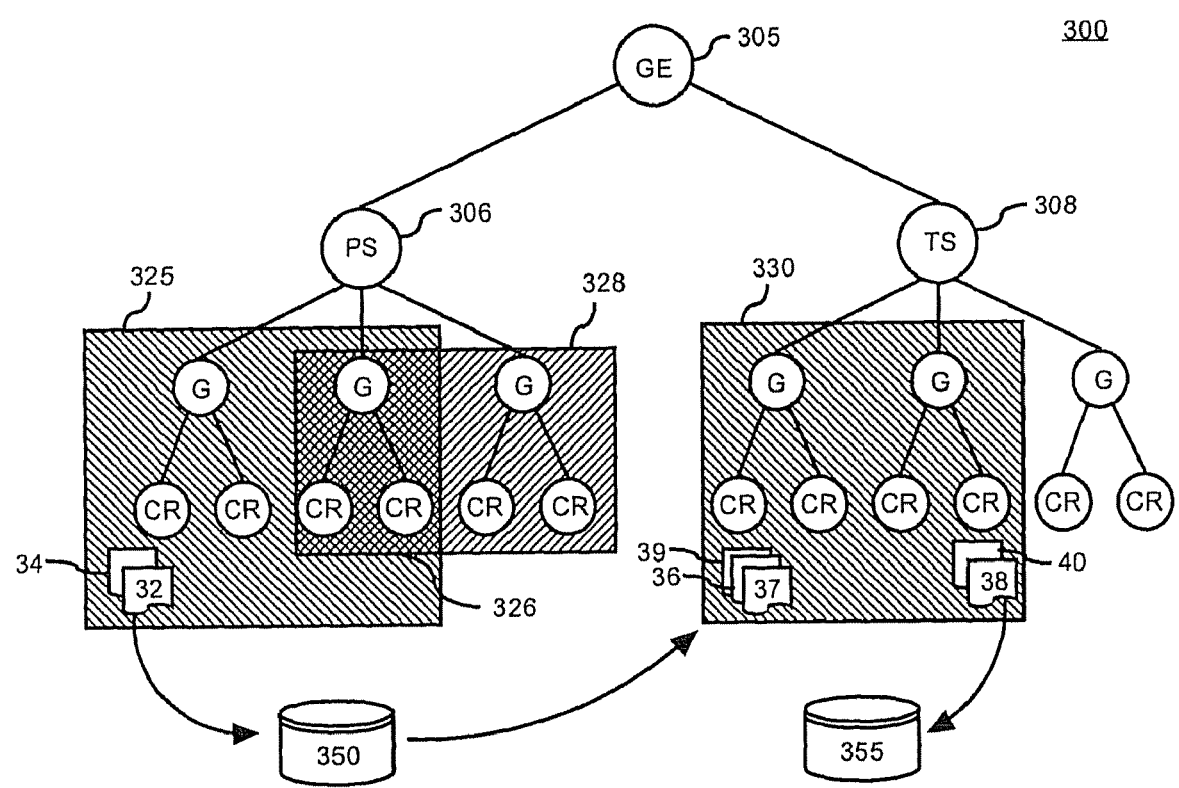
FIG. 3 is a schematic diagram illustrating the testing of application domains within a grid environment in accordance with the inventive arrangements disclosed herein.

FIG. 3 is a schematic diagram illustrating a system 300 for testing application domains within a grid environment in accordance with the inventive arrangements disclosed herein. The system 300 illustrates that a grid environment 305 can include a production segment 306 and a test segment 308, represented by nodes "GE," "PS," and "TS" respectively. The production 306 can represent a partitioned segment of the grid environment reserved for operational purposes. The test segment 308, on the other hand, can represent a partitioned segment of the grid environment 305 reserved for testing purposes.

The production segment 306 and the test segment 308 can each include one or more different grids, each grid represented by a node labeled "G." Each grid can further provide one or more computing resources, represented by nodes labeled "CR." The computing resources can be pooled into the resource pool of the grid environment 305 and can be utilized by various grid users on demand.

Application domains 325, 328, and 330 can exist within the grid environment 305, each functioning as a "virtual application" disposed within the grid environment 305. Unlike traditional applications that generally reside on a single server, application domains 325, 328, and 330 can physically span across several grids and grid components, yet logically function as a single application having a single user interface. Each application domain can utilize several different computing resources. Additionally, a set of computing resources can be utilized by more than one application domain. For example, application domain 325 and application domain 328 share a portion of computing resources labeled shared segment 326. Exemplary types of application domains 325, 328, and 330 can include productivity applications, entertainment applications, development applications, office applications, utility applications, multimedia applications, data management applications, graphic design applications, and the like.

As illustrated, system 300 depicts the testing of application domain 325. The various features of application domain 325 can be executed using one or more hosts 32. Each host 32 can move within the production segment 306 of the grid environment 305. As depicted, host 32 can move between two grids and utilize any of the four computing resources contained within the shaded region demarcating application domain 325. A ghost agent 34 can be associated with the host 32 and can responsively move within the application domain 325 in accordance with the movement of the host 32. Whenever the host 32 executes actions, ghost 34 can record data about the executed actions. This data can be conveyed to application data store 350, which can be a centralized location for logging/recording activities of the application domain 325. The data within the application data store 350 can be used to generate test input.

In one embodiment, further ghost agents (not shown) can be used to gather additional operational usage information for application domains that operationally interact with application domain 325. For example, ghost agents can be disposed within shared segment 326 that can record data relating to the activities of application domain 328. In such an embodiment, the recorded data can be used to generate test input that simulates the conditions within the production segment 306 that affect tested application domain 325.

Application domain 330 can be a test instance of application domain 325. Ghost agent 36 can be deployed into the test segment 308 and can be used to trigger actions similar to the actions taken by the host object 32. The ghost agent 36 can be an active ghost agent within which test input has been incorporated.

In one embodiment, the ghost agent 36 can seek and associate itself with host 37. The ghost agent 36 can then generate message flows directed to the host software object 37. Responsive to the received message flows, the host software object 37 can execute test actions within the test segment 308. Further, the ghost agent 36 can record results of the actions taken by the host 37. Alternately, passive ghost agent 39, which can also be associated with the host 37, can record data relating to host 37.

In another embodiment, the ghost agent 36 need not be associated with the host 37. Instead, ghost agent 36 can directly execute actions within the test segment 308. Ghost agent 36 and/or ghost agent 39 can record data relating to the host 37.

Appreciably, actions executed within test segment 308 affect multiple software objects, which can be associated with various hardware components and software processes within the test segment 308. Host 38 represents one such software object. Ghost agent 40 can be associated with host 38 and can record data. The test output recorded by ghost agents 36, 39, and/or 40 can be conveyed to a test result data store 355.

One of ordinary skill in the art should appreciate that the segmentation of the grid environment 305 need not occur within every embodiment of the present invention and that both operational behavior and tests behavior can occur within a non-delineated grid environment 305. Further, when the grid environment is segmented, the segmentation of the grid environment 305 into the production segment 306 and the test segment 308 can occur in any of a variety of ways that include static and dynamic segmentation methods.

If segmented statically, a fixed portion of grid resources can be established for each segment. If segmented dynamically, the portion of grid resources established for each segment can vary over time and/or with system load. For example, during periods of increased grid activity, such as during a workday, a high resource percentage can be allocated for the production segment 306. This high resource percentage can be lowered during periods of lesser operational actively, thereby allowing a greater portion of resources to be dedicated towards the testing segment 308.

Figure 4:
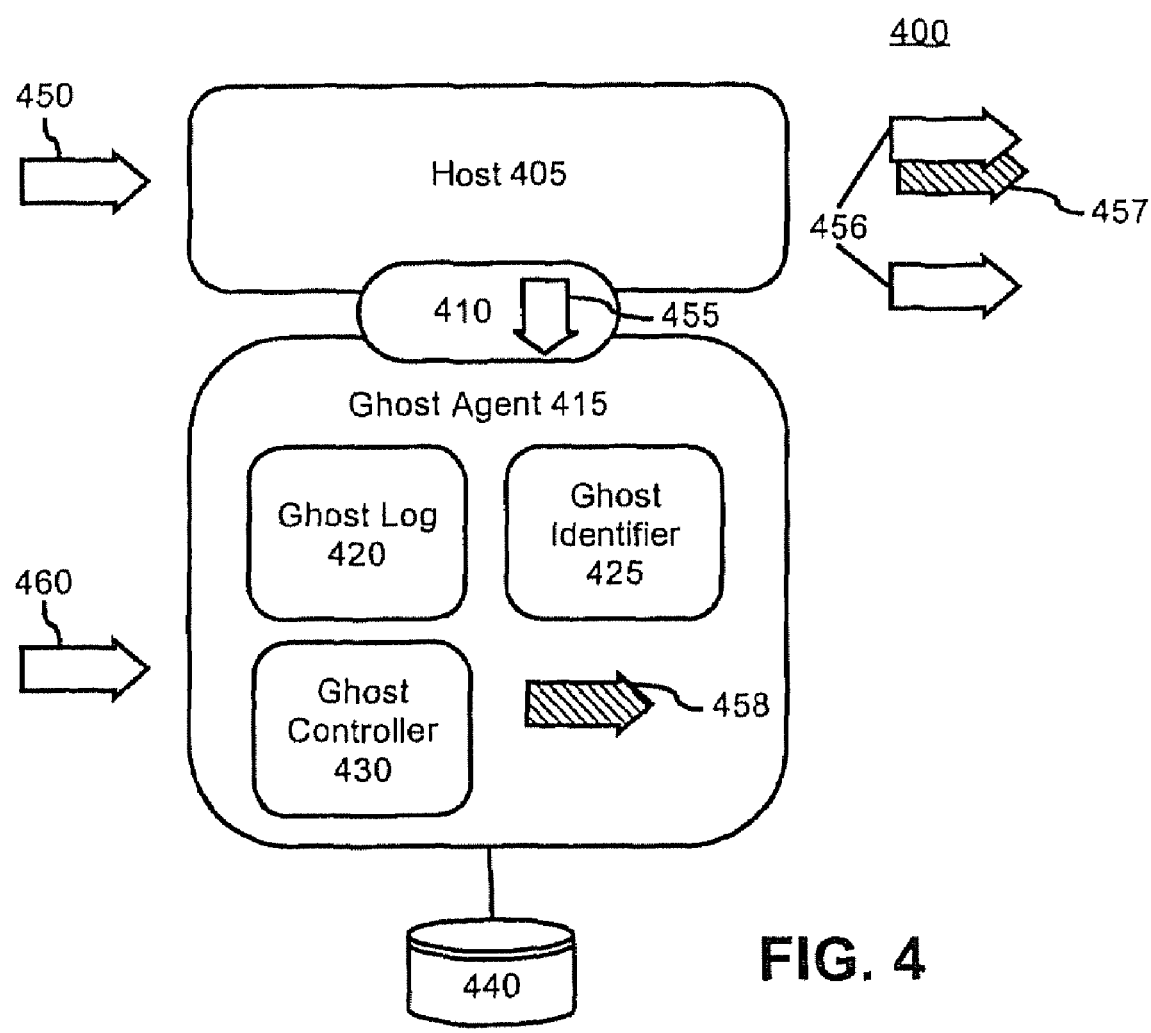
FIG. 4 is a schematic diagram detailing a host software object and a ghost agent within a grid environment in accordance with the inventive arrangements disclosed herein.

FIG. 4 is a schematic diagram illustrating a host 405 and a ghost agent 415 within a grid environment 400 in accordance with the inventive arrangements described herein. The host 405 can be any definable software unit within the grid environment 400 that can receive input 450 and execute actions 456. The input 450 can include messages of any type conveyed to the host 405, such as keyboard input, procedural calls, and the like. The actions 456 can be relatively high-level actions and well as low-level actions. High-level actions can include software routines that can contain one or more external procedural calls. Low-level actions can include hardware device calls and the execution of one or more processes or threads.

The ghost agent 415 can be associated or bound to the host 405 though the ghost interface 410. The ghost interface can generate replicated actions 455 that are copies of the actions executed by the host 405, using any of a variety of suitable techniques. For example, techniques used by software debugging programs to attach monitors to running programs in order to evaluate system behavior and step through code can be used by the ghost interface 410. Alternatively, techniques used by system calibration and hardware performance testing utilities can be used by the ghost interface 410 to bind the ghost agent 415 with the host software object 405. Further, operating system level commands, tools, and functions analogous or similar to the UNIX commands "strace" and "ptrace," can potentially be used by the ghost interface 410 to bind the host software object 405 with the ghost agent 415.

The ghost agent 415 can analyze and/or modify the replicated actions 455 and record data relating to the replicated actions 415. A replicated action 455 can be utilized by the ghost agent 415 as a passive action 458 or an active action 457. The passive action is a "read only" action that has no operational effect upon the grid environment 400. An active action 457, on the other hand, is executed within the grid environment 400.

The ghost agent 415 can include a ghost log 420, a ghost identifier 425, and a ghost controller 430. The ghost log 420 can record the data relating to the replicated actions 455, thereby creating a log. The ghost log 420 can be configured to record all activities relating to the associated host 405 or can be configured to record only selected activities. For example, in one embodiment, the ghost log 420 can record only activities considered errors, thereby generating an error log. In another example, the ghost log 420 can record a statistically relevant portion of actions, such as recording data relating to every fifth replicated action 455. The ghost log 420 can also capture system information and add annotations from this system information to the generated log.

For example, system clock information can be captured and used to annotate the time between receiving a replicated action 455 and the completion time for an associated active action 457. In another example, metadata information contained within message flows, such as input 450, action 456, and active action 457, can be utilized by the ghost log 420. Additionally, the ghost log 420 can time stamp data relating to replicated actions 455.

The ghost log 420 can also record the log information in a ghost log repository 440. The ghost log repository 440 can be a temporary buffer or a persistent data storage area. If the ghost log repository 440 is external to the ghost agent 415, any of a variety of different mechanisms can be utilized to convey the log data to the ghost log repository 440.

For example, an intermittent communication link, such as a unicast or a point-to-point communication link can be established between the ghost log 420 and the ghost log repository 440 through which data can be conveyed. In another example, a buffer space within the ghost agent 415 can record log information. Whenever the buffer reaches a specified volume of data, a message containing the buffered information can be conveyed to the ghost log repository 440 and the buffer within the ghost agent 415 can be cleared and used to store fresh data.

In yet another example, ghost agents 415 can convey log data to a local data server. The local data server can then convey all received log data to the ghost log repository 440 from time to time or on a periodic basis. In still another example, the ghost agent 415 can intermittently deposit log data to a local location. Then a data-reaping object can gather packets of the log data that have been locally deposited by the various ghost agents 415. The packets of log data can be conveyed to the ghost log repository 440 by the data-reaping objects.

The ghost identifier 425 can provide identification, authorization, and security related functions for the ghost agent 415. That is, the ghost identifier 425 can identify the ghost agent 415 to the various components of the grid environment 400. Accordingly, servers in the grid environment 400 can have an awareness of the ghost agent 415. The grid servers can then use policy-based controls to manage permissions, authentication, resource utilization, and security for the ghost agents 415. Ghost agents 415 adhering to the established policies can be permitted to automatically enter and exit the various grids of the grid environment 400.

The ghost agent 415 can be granted different access privileges to computing resources as the ghost agent 415 traverses from one grid in a grid environment 400 to another depending on grid-based policies. Privileges afforded the ghost agent 415 can be determined any manner known in the art. For example, a ghost agent 415 can replicate the passwords provided by the host software object 405 and use the replicated passwords to provide authentication to the grid environment 400. In another example, before a ghost agent 415 can be permitted to follow an associated host 405 from one grid in the grid environment 400 to the next, a password or digital certificate unique to the ghost agent 415 can be required. The ghost agent 415 can receive the same system privilege level with the grid environment 400 as the host 405 or can receive a different privilege level.

The ghost controller 430 can manage the ghost agent 415. For example, the ghost controller 430 can establish a life span for a particular ghost agent 415 so that the ghost agent 415 self-terminates after a designated period. In another example, the ghost controller 430 can restrict the computing resources consumed by the ghost agent 415, thereby freeing up system resources in the grid environment 400 for improved operational performance. Alternately, the ghost controller 430 can increase the computing resources consumed by the ghost agent 415, thereby slowing down operational performance in the grid environment 400. Slowing performance can be beneficial when simulating a load during testing.

In one embodiment, the ghost controller 430 can accept control signals 460 from an external source. For example, the ghost controller 430 can receive control signals 460 causing the ghost agent 415 to alter previously designated behavior. Further, the ghost controller 430 can include a listener object capable of responding to particular events broadcasted by a corresponding notifier object. For example, a server could broadcast a signal causing all ghost controllers 430 to limit the resource consumption of all ghost agents 415 presently disposed in the server. Similarly, a grid wide broadcast could cause specified ghost agents 415 to self-terminate.

It should be noted that while ghost log repository 440 is depicted as being external and possibly remotely located from the ghost agent 415, it should be appreciated that the ghost log repository 440 can also be an allocated memory space internal to the ghost agent 415. For example, the ghost log repository 440 can be a dynamically allocated segment of random access memory (RAM) available to the ghost agent 415 as needed.

Figure 5:
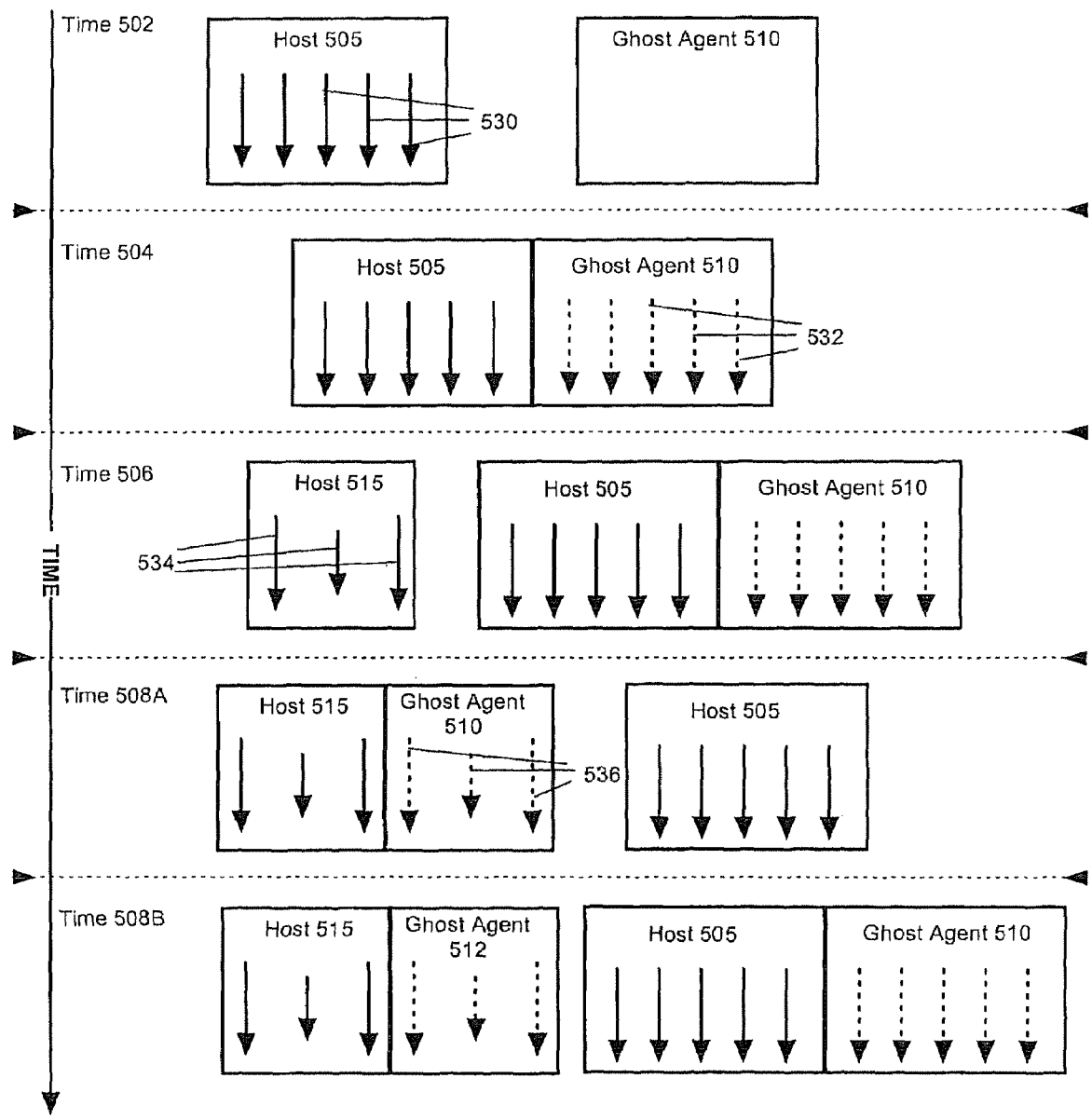
FIG. 5 is a schematic diagram illustrating the interaction between hosts and ghost agents over time in accordance with inventive arrangements disclosed herein.

FIG. 5 is a schematic diagram illustrating the interaction between hosts and ghost agents over time in accordance with the inventive arrangements disclosed herein. The interaction can begin at time 502 with an unassociated ghost agent 510 and a host software object 505 executing host actions 530. At time 504, the ghost agent 510 can associate itself with the host software object 505. During this association process, each host action 530 within the host software object 505 can be replicated within the ghost agent 510 as a ghost action 532. Further, anytime a new action is initiated within the host software agent 510, the new action can be replicated within the associated ghost agent 510.

Each ghost action 532 can be either a passive or an active action. For example, the host actions 530 can be executed within the grid environment while the ghost actions 532 can be passive actions that are operationally disabled. Passive actions are those actions that do not affect the operational behavior of the host software agent 505.

In another arrangement, the ghost actions 532 can be active actions affecting the operational performance of the environment and/or the associated host software agent 505. For instance, a ghost action 532 can consume limited computing resources thereby inducing a delay into the system and potentially slowing down system response time for the corresponding host software object 505. Delays induced by ghost actions 532 can be tailored by changing the execution details of the instruction set described within individual ghost actions 532.

For example, if a host action 530 invokes a portion of code such as an interactive process that cycles fifty times, the originally copied ghost action 532 can also cycle fifty times. The ghost agent 510 can increase the number of cycles in the iterative process to some number greater than fifty to slow down processing time and can decrease the cycles to a number less than fifty to speed up processing time.

At time 506, an interaction between host software object 505 and host software object 515 executing actions 534 can occur. This interaction can trigger either a transfer of the ghost agent 510 or a cloning of the ghost agent 510, wherein time 508A illustrates the results of an exemplary transfer action and time 508B illustrates the results of an exemplary cloning action.

At time 508A, the ghost agent 510 can be transferred from host software object 505 to host software object 515. For example, the ghost agent 510 can be first disassociated with host software object 505. The disassociation causes the ghost agent 510 to stop replicating actions of the host 505. Then the ghost agent 510 can be associated with host software object 515. During the association, the actions 534 can be replicated within ghost agent 510 resulting in ghost actions 536. Accordingly, the actions now recorded by the ghost agent 510 and placed within a ghost log repository are based upon host software object 515 and are not based upon host software object 505. In another example, the ghost agent 510 can be replicated and attached to the host software agent 515. Once replicated, the original ghost agent 510 associated with the host software object 505 can be deleted.

At time 508B, the ghost agent 510 can be cloned resulting in the creation of ghost agent 512, which is a copy of ghost agent 510. Ghost agent 512 is then associated with host 515. During the association, the actions 534 can be replicated within ghost agent 512. Accordingly, the actions for both host software object 505 and host software object 515 can be recorded by respective ghost agents 510 and 512 and thereafter placed in the ghost log repository for logging purposes.

It should be noted that ghost agents 510 and 512 can be self-managing, self-identifying software objects capable of performing predefined tasks in a self-sufficient manner. For example, the ghost agents 510 and 512 can be programmed to seek a host software object of a specified type, to track a desired host software object from one grid location to another within a grid environment, to move from one grid in a grid environment to another, and/or to associate with host software objects. In another example, the ghost agents 510 and 512 can be programmed to clone and attach themselves whenever a predetermined condition occurs, such as whenever a user object of a particular type is encountered.

The ghost agents 510 and 512 can also exchange information between themselves. For example, ghost agent 510 and ghost agents 512 can convey messages, records, and individual replicated actions to each other. Notably if ghost agent 510 and ghost agent 512 are disposed in different grids and if each wanted to move to the other's grid, the swapping of information between the two ghost agents 510 and 512 can be performed in lieu of moving each ghost agent.

In particular embodiments, each grid in a grid environment can contain a number of "blank" ghosts. "Movement" of a ghost from a first grid to a second grid can actually be performed by transferring the information from the "moving" ghost in the first grid to the "blank" ghost in the second grid. The "moving" ghost, now emptied of content, can be treated as a "blank" ghost for the first grid.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A non-transitory machine-readable storage medium, comprising computer instructions for testing applications within a grid environment, wherein said grid environment comprises a production segment and a test segment, the computer instructions comprising:

identifying an application comprising one or more hosts that execute actions within a grid of said grid environment disposed in said production segment, wherein at least a portion of said hosts move from one grid in said grid environment to another grid in said grid environment;

testing the application by identifying at least a portion of said hosts to yield identified hosts and associating a passive ghost agent within said grid with each of said identified hosts to yield an associated host, wherein said passive ghost agent is configured to replicate and record said actions executed by said associated host in said grid, wherein said recorded data is used to simulate user interactions within said test segment, wherein said replicated actions of said passive ghost agent are prevented from operationally executing in said grid environment, and wherein said passive ghost agent moves responsively from said one grid to said another grid in response to movement of said associated host.

2. The non-transitory machine-readable storage medium of claim 1, wherein said testing further comprises deploying a different host configured to execute actions within said test segment and associating a different passive ghost agent with said different host, wherein said different passive ghost agent is configured to record data related to actions executed by said different host in said test segment.

3. The non-transitory machine-readable storage medium of claim 2, wherein said testing further comprises deploying an active ghost agent in said production segment, wherein said active ghost agent is configured to trigger said different host in said test segment to execute said actions based upon data recorded by said passive ghost agent in said production segment.

4. A non-transitory machine-readable storage medium in a grid computing environment, comprising computer instructions for:

identifying a plurality of hosts operating within a plurality of grids of a grid environment, wherein each of said hosts is a software object; and testing applications in said grid environment using a passive ghost agent associated with each one of said plurality of hosts operating within said grid environment, said passive ghost agent comprising a ghost controller for:

managing interactions between said passive ghost agent and said grid environment, replicating and recording actions executed by an associated host in a ghost log of said passive ghost agent, and identifying said passive ghost agent to components within a grid environment, wherein at least a portion of said hosts move from one grid within said grid environment to another grid, wherein said passive ghost agent automatically moves from said one grid to said another grid within said grid computing environment in response to said associated host moving from said one grid to said another grid, wherein said replicated actions of said passive ghost agent are prevented from operationally executing in said grid environment, and wherein said passive ghost agent is used to test grid-based applications.

5. The non-transitory machine-readable storage medium of claim 4, further comprising computer instructions for:
generating test input using said recorded data.

6. The non-transitory machine-readable storage medium of claim 4, further comprising computer instructions for:
simulating user actions during tests using a ghost agent in a testing segment of said grid environment.

7. The non-transitory machine-readable storage medium of claim 4, further comprising computer instructions for:
generating test output using a different passive ghost agent in a testing segment of said grid environment.

8. A non-transitory machine-readable storage having stored thereon, a computer program having a plurality of code sections, said code sections executable by a computer for causing the computer to perform the steps of:
identifying a plurality of hosts located within a plurality of grids of a grid environment, wherein each of said hosts is a software object;
for each of said grids, associating a passive ghost agent in said grid with each one of said identified hosts operating in said grid, wherein said passive ghost agent is configured to replicate and record at least one action of said host within said grid environment, wherein said replicated actions of said passive agents are prevented from operationally executing in said grid environment;
moving at least one of said hosts from one of said grids to another of said grids within said grid environment;
in response to said moving of said host, moving said passive ghost agent from said one of said grids to said another grid;
generating test input from said recorded data; and,
testing within said grid environment using said test input.

9. The non-transitory machine-readable storage of claim 8, further comprising the steps of:
determining operational metrics for at least one component to be tested;
modifying said test input based upon said operational metrics.

10. The non-transitory machine-readable storage of claim 8, wherein said hosts are disposed within a production segment of said grid environment and wherein said testing is performed within a test segment of said grid environment.

11. The non-transitory machine-readable storage of claim 10, further comprising the steps of:
inputting said test input into at least one active ghost agent deployed within said test segment; and,
executing actions within said test segment based upon said active ghost agent that received said test input.

12. The non-transitory machine-readable storage of claim 11, further comprising the steps of:
recording data relating to said testing using said deployed ghost agents.

13. The non-transitory machine-readable storage of claim 8, wherein said hosts are associated with a specific application, wherein said testing is conducted for said application.

14. The non-transitory machine-readable storage of claim 13, further comprising the step of:
determining system requirements for said application based at least in part upon output from said testing.

15. The non-transitory machine-readable storage of claim 13, further comprising the step of:
gathering usage data for at least one different application using passive ghost agents.

16. The non-transitory machine-readable storage of claim 15, further comprising the step of:
testing said specific application while simultaneously simulating load conditions resulting from said at least one different application.

* * * * *